Sept. 14, 1965 E. S. LEE III 3,206,735

ASSOCIATIVE MEMORY AND CIRCUITS THEREFOR

Filed June 14, 1962 3 Sheets-Sheet 1

INVENTOR.
EDWIN S. LEE, III
BY Christie, Parker & Hale
ATTORNEYS.

ASSOCIATIVE MEMORY AND CIRCUITS THEREFOR

Filed June 14, 1962

3 Sheets-Sheet 2

INVENTOR
EDWIN S. LEE, III
BY Christie, Parker & Hale
ATTORNEYS.

Sept. 14, 1965 E. S. LEE III 3,206,735

ASSOCIATIVE MEMORY AND CIRCUITS THEREFOR

Filed June 14, 1962 3 Sheets-Sheet 3

INVENTOR.
EDWIN S. LEE, III
BY Christie Parker & Hale
ATTORNEYS.

United States Patent Office 3,206,735
Patented Sept. 14, 1965

3,206,735
ASSOCIATIVE MEMORY AND CIRCUITS THEREFOR

Edwin S. Lee III, Altadena, Calif., assignor to Burroughs Corporation, Detroit, Mich., a corporation of Michigan
Filed June 14, 1962, Ser. No. 202,505
7 Claims. (Cl. 340—174)

This invention relates to storage apparatus and, more particularly, to a direct access memory system.

The use of arrays of magnetic core elements to store coded information in computer systems and the like is well known. Generally, the magnetic cores are arranged in predetermined configurations, such as a row-column array, and the coded information is assigned to and stored in particular row-column positions in the array designated by preselected codes termed "addresses." In such conventional storage apparatus, to retrieve coded information from the array, an operator must first determine the address of the coded information, usually by reference to a correlation table or chart. The operator then utilizes the address to institute the energizing of the particular row-column position in which the coded information is stored to read the information out of storage. This process is repeated by the operator for each retrieval operation.

The time required for the operator to determine the address of particular coded information represents wasted time, as far as the overall computer operation is concerned, comprises a material portion of the operator's time in programming the computer's operation, and in some cases poses a restrictive limitation upon the rate at which information may be processed in the computer system.

In view of the above and in order to reduce the time required to retrieve magnetically stored information, there has recently been developed a magnetic stored apparatus which permits direct access to stored information thereby eliminating the requirement of maintaining or referring to a correlation chart to retrieve coded information.

One such storage apparatus is the subject of the copending patent application, Serial No. 780,056, filed December 12, 1958, and assigned to the same assignee at the present invention.

Briefly, as described therein, the storage apparatus comprises an identification storage and a memory storage. The identification storage automatically performs the charting and correlation functions previously performed by the operator and includes a plurality of transfluxors arranged in a row-column array. The memory storage includes the conventional row-column arrays of magnetic cores. Each binary coded word to be stored in the storage apparatus has associated therewith a particular identification binary code or tag.

Utilizing conventional coincident current writing techniques, each coded word is written in a different row of the memory storage simultaneous with its tag being written into an associated row in the identification storage—the tags thus stored in the identification storage being represented by an unblocked transfluxor for a binary one and a blocked transfluxor for a binary zero.

To retrieve a particular coded word from the memory storage, the tag for the word is stored in a compare register having a plurality of outputs, one feeding each of the column conductors of the identification storage. At a predetermined time the compare register is energized to excite the column conductors of the identification storage and simultaneously apply the binary coded tag to a bias generator.

The bias generator is coupled in series circuit relationship with the output winding of each row of transfluxors in the identification storage and develops an output signal one each output winding having a magnitude proportional to the number of binary characters of a predetermined binary value in the tag. The output signal is of opposite polarity relative to an output signal developed in an output winding associated with an unblocked transfluxor of the identification storage in response to a binary coded signal of the predetermined value applied to its associated column conductor.

The output signal developed by the bias generator is added to the output signals generated in the output winding of each row of transfluxors in the identification storage to develop a resultant output signal on each such output winding. Due to the magnitude and polarity of the output signal generated by the bias generator a discrete resultant output signal is developed in only the output winding for the row of transfluxors in which a match occurs between the tag stored in the given row and the tag stored in the compare register. The discrete output signal is then utilized to directly read the desired coded word out of the memory storage.

As described, the identificaion storage of transfluxors, together with the compare register and bias generator, form a comparing circuit for directly locating the position of binary coded tag information stored in the identification storage by matching the stored tag information with like input signal informtion to generate a discrete location output signal on the output conductor of the row in which the information is stored. In the aforementioned copending patent application, the bias generator was broadly disclosed as developing an output signal having a proper magnitude and a polarity to produce a discrete output signal in only the output winding of the row in which the aforementioned match occurs. Although there are many electronically controllable devices which may be utilized to perform this operation, in practice their implementation and design has proven expensive and complex. This is primarily due to the variable characteristics of the transfluxors comprising the identification storage. For example, it has been found that the output signal developed by a transfluxor is not a constant voltage but rather is more like a pointed half sine wave which varies from transfluxor to transfluxor depending upon the geometry of the transfluxor and the amplitude of the current causing flux within the transfluxor to switch. In addition, even through a transfluxor is blocked, upon receiving an input current signal the transfluxor still produces a small noise signal. Thus, although the transfluxor for each row and column of the identification storage may be chosen to have like output characteristics, it has, in the past, been difficult, particularly where large arrays of transfluxors are utilized in the identification storage, to construct a bias generator which develops the necessary output signal for producing a discrete output signal from the identification storage under all input signal conditions.

In view of this, the present invention provides a bias generator that is particularly useful in the above described comparing circuit which is simple in design and implementation and which generates an output signal component for each column of the identification storage corresponding in magnitude to the output signal developed by the transfluxor of the row of the array in which a match occurs between the binary coded information stored therein and that applied to its column conductor from the compare register to develop a discrete locating output signal in the identification storage independent of the size of the transfluxor array.

Briefly, to accomplish this, the bias generator includes a plurality of transfluxors, each linked by a different column conductor of the identification storage. Each transfluxor is selected to have substantially the same output characteristic as each transfluxor of its associated column. A common output winding links all transfluxors of the bias generator and is connected in series with the output winding of each row of transfluxors in the identification storage. Also linking each of the transfluxors of the bias generator are means including an input winding for controlling the direction of flux in the transfluxor such that when the binary coded information signal is transferred from the compare register to the column conductors, the direction of flux is only switched in those transfluxors of the bias generator receiving a binary character of a predetermined binary valve to develop an output signal in the output winding thereof. Those transfluxors not receiving a binary character of the predetermined value remain effectively blocked and only develop a small noise signal.

Since the output characteristics of the transfluxors in the bias generator are substantially the same as those of the associated column in the identification storage, and since each transfluxor is excited by the same current signal which excites the transfluxors of the associated column, the output signal developed by each switching transfluxor of the bias generator corresponds in magnitude and is arranged to be opposite in polarity to the output signal generated by each unblocked transfluxor of the associated column in response to a binary character of the same binary value. Thus, since the transfluxors of the bias generator, when excited by a binary character of other than the predetermined value, generate a noise signal corresponding to that developed in the output winding associated with a blocked core in response to a binary input of a like value, a total output signal is developed by the bias generator which, when added to the output signals developed by the rows of transfluxors of the identification storage, produces a discrete output signal only in the output winding of the row in the identification storage for which an exact match occurs between the stored and input binary information.

The above, as well as other features of the present invention, may be more clearly understood by reference to the following detailed description when considered with the drawings in which.

Figure 1:
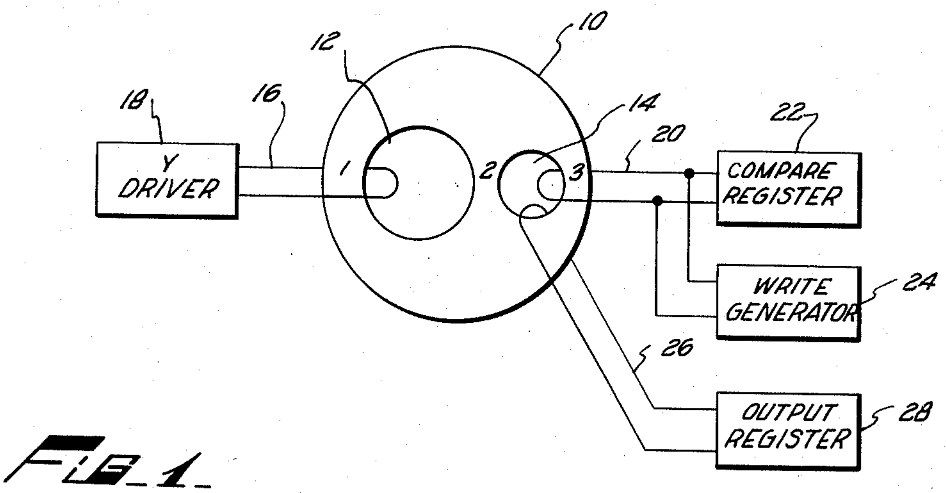
FIGURE 1 is a schematic representation of the transfluxor.

Referring to FIGURE 1, there is illustrated a basic form of a transfluxor such as described in detail in the March 1956 Proceedings of IRE at pages 321–332. As illustrated, the transfluxor includes a magnetic core element 10 having a substantially rectangular hysteresis characteristic. The core element 10 includes a plurality of apertures 12 and 14 so arranged and proportioned to define three magnetic legs in the core element shown as legs 1, 2 and 3. The aperture 12 is considerably larger than the aperture 14 and is positioned adjacent to the left-hand side of the core 10 as to define leg 1 while the aperture 14 is positioned inwardly of the right edge of the core 10 to define legs 2 and 3 on opposite sides thereof. The aperture 14 is arranged in porportion so that legs 2 and 3 are substantially equal in cross section while the aperture 12 is proportioned so that the cross section of leg 1 is equal to or greater than the sum of those of legs 2 and 3.

Multiple flux paths may then be traced around the apertures 12 and 14. One flux path extends between legs 1 and 2 around the aperture 12, another flux path extends around the aperture 14 in legs 2 and 3 while a third flux path extends between legs 1 and 3 around the apertures 12 and 14.

The direction of flux in legs 1, 2 and 3 of the magnetic core element 10 is controlled by windings coupled to the core element. For example, the windings include a drive winding 16 interlaced through the large aperture 12 to control the magnetic flux in leg 1. The drive winding 16 is connected to a signal source represented in block form at 18 as a Y driver.

A compare winding 20 which is coupled to a compare register 22 and to a write generator 24 passes through the aperture 14 as illustrated. The compare winding 20 is provided to control the magnetic flux in leg 3.

A sensing or output winding 26 is interlaced through the small aperture 14 and coupled to an output register 28. The output winding 26 is arranged to be responsive only to flux changes in leg 3 to provide an output signal for the register 28.

Basically, in operation, if the Y driver 18 is initially energized to develop an intense current pulse in the drive winding 16 which produces a clockwise flow of flux through legs 1, 2 and 3, legs 2 and 3 will be saturated. This is possible since the larger leg 1 provides the necessary return path. Legs 2 and 3 remain saturated after the termination of the initial pulse since the remnant and saturated inductions are almost equal.

In this state, if a signal is then generated at the compare register 22 and applied to the compare winding 20 to produce an alternating magnetomotive force along the path surrounding the small aperture 14 but of insufficient amplitude to produce a sufficient flux change around the aperture 12, the magnetomotive force will have, during one phase, a clockwise sense and tend to produce an increase in flux in leg 3 and a decrease in flux in leg 2. Because leg 3 is saturated no increase in flux is possible. Consequently, there can be no flux flow at all since magnetic flux flow is necessarily in a closed path. Similarly, during an opposite phase of the compare signal the magnetomotive force is in a counter-clockwise sense and tends to produce an increase in flux in leg 2. Since leg 2 is also saturated, this is again impossible. Under these conditions the flux flow is said to be "blocked" as a result of the direction of saturation of either legs 2 or 3. In its blocked state the magnetic core 10 will not provide a flux change linking the output winding 26 and therefore no output voltage is induced therein.

If a current pulse is then provided from the Y driver 18 through the winding 16 in a direction producing a counterclockwise magnetomotive force around the aperture 12 simultaneous with the application of a pulse signal from either the compare register or write generator through the winding 20 in a direction producing a clockwise magnetomative force around the aperture 14 and if neither magnetomotive force alone is large enough to switch the flux in leg 2 but of sufficient intensity when combined to do same, leg 2 following the application of such pulse signals will be saturated in an upward direction or in a counterclockwise sense while leg 3 will be saturated in a downward direction or clockwise sense. With the magnetic core 10 in such a magnetic state the application of an alternating magnetomotive force around the small aperture 14 resulting from energizing the compare winding 20 from its associated register 24 will produce a corresponding flux flow around the aperture 14. The alternating flux flow induces a voltage signal in the output winding 26. This is the "unblocked" state of the transfluxor comprising the core element 10.

The blocked and unblocked states of the magnetic core element 10 may be identified as storing either a binary one or a binary zero signal. Thus, for example, the magnetic core 10 in a blocked state corresponds to a binary zero while in an unblocked state corresponds to a binary one. It is therefore to be recognized that the magnetic core element 10 functioning as a transfluxor, may be utilized as an element in a row-column array of like elements for storing coded information by the selective energizing of row and column conductors wherein the row conductor may be the drive winding 16 and the column conductor the compare winding 20. Further, since an energizing of the compare winding 20 alone of a blocked transfluxor does not develop an output signal in the output winding 26 while the same energizing of the compare winding of an unblocked transfluxor does produce an output signal, the transfluxor may be interrogated by selective energizing of the compare winding without destroying the information stored in the transfluxor. Thus, an array of transfluxors may be repeatedly interrogated without changing the information stored therein.

Figure 2:
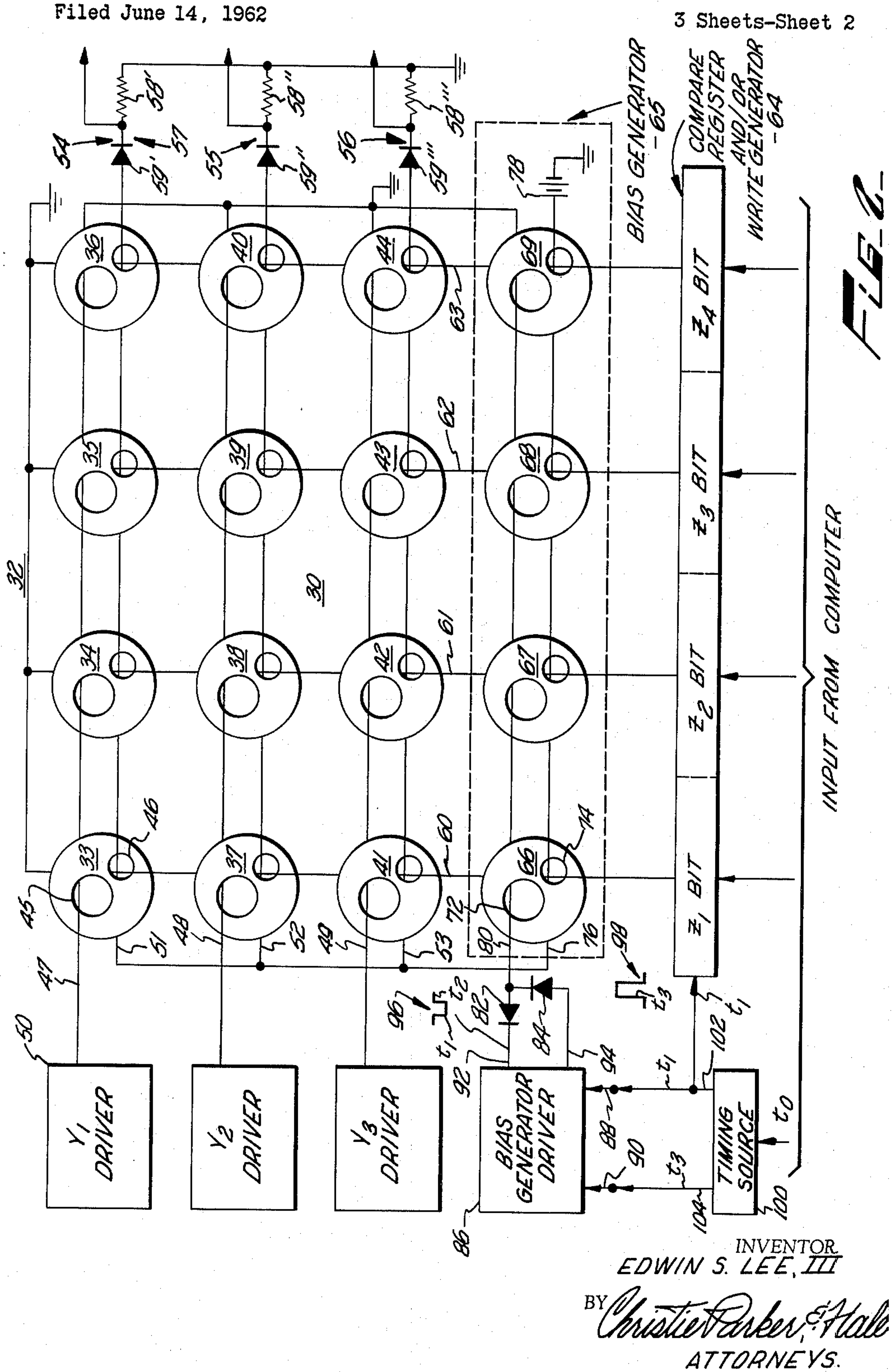
FIGURE 2 is a schematic-block diagram representation of a parallel comparing circuit illustrating a preferred form of the bias generator and embodying the invention.

Such an array of transfluxors is illustrated generally at 30 in FIGURE 2 as a part of a parallel comparing circuit 32 of the type described in detail in the aforementioned copending patent application, Serial No. 780,056, filed December 12, 1958, and which disclosure is incorporated by reference herein.

As represented, the transfluxor array 30 includes, by way of example only, twelve transfluxors numbered 33 through 44 inclusive. The transfluxors are arranged in three rows of four transfluxors each such that the first row includes the transfluxors 33, 34, 35 and 36 while the third row includes the transfluxors 41 through 44. The transfluxors are also aligned in four columns of three transfluxors each. For example, the first column includes the transfluxors 33, 37 and 41. The transfluxors of each column are carefully selected to have substantially the same geometry and output characteristics.

Each transfluxor is arranged substantially as described in FIGURE 1, each comprising a magnetic core element having a substantially rectangular hysteresis characteristic, a large aperture, and a small aperture, such as respectively identified by the reference numerals 45 and 46 for the transfluxor 33. Associated with each row of transfluxors is a drive winding, such as 47 for the first row, 48 for the second row, and 49 for the third row. The drive windings each pass in a like direction through the large aperture of each transfluxor in its associated row and are connected between a Y driver, such as 50, and ground. Also associated with each row of transfluxors is an output winding such as 51 for the first row, 52 for the second row, and 53 for the third row. The output windings each pass in a like direction through the small aperture of each transfluxor in its associated row.

Connected to each of the output windings are a plurality of separate output circuits 54, 55 and 56, each including a threshold device 57 and a load resistor 58. By way of illustration only, the threshold device 57 is represented as being a diode 59 having its anode coupled to an output winding and its cathode coupled to an associated load resistor which is, in turn, connected to ground. Thus, for example, the series circuit 54 includes a diode 59′ and a resistor 58′ connected in series with the output winding 51, while the series circuit 55 includes a diode 59″ and a resistor 58″.

Associated with each column of transfluxors in the transfluxor array 30 is a compare winding such as 60 for the first column, 61 for the second column, 62 for the third column, and 63 for the fourth column. The compare windings each pass in a like direction through the small aperture of each transfluxor of its associated row and are connected in common to ground. Each compare winding is also coupled to a different cell or stage of a compare register and/or a write generator 64.

With the transfluxors so arranged, coded information may be stored therein as described in connection with FIGURE 1 by the selective energization of the Y drivers and the write generator 64, the coded information being stored in the transfluxors by blocking or unblocking the transfluxors to represent either a binary zero or a binary one.

As described in the aforementioned copending patent application, the comparing circuit 32, in addition to the transfluxor array 30, also includes a bias generator 65. The bias generator 65 of the present invention includes a plurality of transfluxors represented generally as 66, 67, 68 and 69. Each transfluxor is associated with a different column of the array 30 and therefore with the corresponding bit or binary character in the compare register. Thus, for example, the transfluxor 66 is associated with the first column while the transfluxor 69 is associated with the fourth column of the array 30. Each transfluxor of the bias generator 65 is carefully chosen to have substantially the same geometry and output characteristics as the transfluxors in the associated columns of the array 30.

Similar to the transfluxor described in connection with FIGURE 1, each transfluxor of the bias generator 65 is composed of a core element having a large aperture and a small aperture, such as 72 and 44 for the transfluxor 66, to define three legs in the core element and to establish a pair of controllable flux paths of substantially different lengths linking the legs.

As illustrated, the compare winding of each column of the array 30 passes in a like direction through the small aperture of the transfluxor in the bias generator associated therewith. Thus, for example, the compare winding 60 of the first column passes through the small aperture 74 of the transfluxor 66 to the $Z_1$ bit of the compare register 64.

Also linking the small apertures of each transfluxor of the bias generator 65 is an output winding 76. As illustrated, the output winding 76 passes through the small apertures in the transfluxors of the bias generator in the same direction as the output windings 51, 52 and 53 pass through the small apertures of the transfluxors in their associated rows. The output winding 76 is also coupled in series with the output windings for each row of transfluxors in the array 30 and through a battery 78 to ground.

Passing in a like direction through each of the large apertures of the transfluxors in the bias generator 65 is an input or a drive winding 80. The drive winding 80 is coupled in common with the drive windings of each row in the array 30 to ground and through a pair of diodes 82 and 84 to a bias generator driver indicated in block form at 86. The diode 82 is poled for series current flow from ground to the bias generator driver while the diode 84 is poled for series current flow from the bias generator driver 86 to ground. The bias generator driver 86 may be a bistable circuit such as a vacuum tube or transistor flip-flop including a pair of inputs 88 and 98 to selectively energize a pair of output leads 92 and 94 with current signals as represented by the waveforms 96 and 98 respectively.

The transfluxors of the bias generator 65, as thus described, are similar in arrangement to the transfluxors described in connection with FIGURE 1 and may therefore be selectively blocked and unblocked to allow switching of flux around the small apertures thereof in a manner substantially similar to that previously described.

Considering the overall operation of the comparing circuit 32, information to be stored in the array 30 is written into the array by simultaneously energizing the write generator 64 and the Y driver of the row into which the coded information is to be stored. For example, if the binary word 1001 is to be written into the first row of the array, the write generator 64 energizes only the compare windings 60 and 63 simultaneous with the energizing of the Y driver 50 to switch flux in the second leg of the transfluxors 33 and 36 in a clockwise direction. As previously described, such a switching of flux places the transfluxors 33 and 36 in an unblocked state to store a binary one. Since the compare windings 61 and 62 were not energized or were energized with a current signal developing a magnetomotive force in opposition to that developed by the Y driver, the transfluxors 34 and 35 each remain in a blocked state to store a binary zero.

By a similar operation different binary coded words may be stored in each row of transfluxors in the array 30 by simultaneous energizing of the write generator 64 and the particular Y driver associated with the given rows. Thus, the coded words 1010 and 1101 may be stored in the second and third rows.

Since, in the white operations, the bias generators driver 86 is not energized, the transfluxors of the bias generator remain in a blocked state.

Assuming that it is desired to locate the binary word 1001, the binary codes word 1001 is fed from the computer into the compare register 64 at a time $t_0$ simultaneous with the application of a timing pulse to a timing source represented in block form as 100. The timing source, by way of example only, may be a tapped delay line having a plurality of outputs such as 102 and 104.

Figure 3:
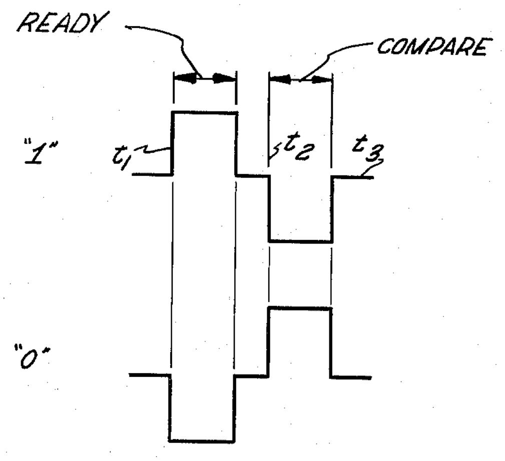
FIGURE 3 is a schematic representation of the waveforms of the pulse signals developed by the compare register of FIGURE 2.

The binary input word 1001 is written into separate stages of the compare register 64 designated by the bits Z1, Z2, Z3 and Z4, reading from left to right. The bistable stages of the compare register 64 may be formed from vacuum tube or transistor bistable devices, such as flip-flops. Each stage of the compare register 64 is arranged to develop an output signal having a "ready" and a "compare" pulse portion. The ready and compare pulses are of opposite polarity and of opposite relative polarity depending upon whether a binary zero or a binary one is stored in the given stage. Thus, for example, as illustrated in FIGURE 3, if a binary one is stored in a stage of the compare register 64, the compare register, upon being energized, develops a ready pulse having a positive polarity followed by a compare pulse of a negative polarity. In a similar manner, if a binary zero is stored in the given stage of the compare register, the compare register, upon being energized, develops a negative ready pulse followed by a positive compare pulse. As will be hereinafter described, the ready and compare pulses are utilized to preset the direction of flux in the second and third legs of each unblocked transfluxor in the transfluxor array 30 and during the ready portion of the compare register output to provide means for writing information into the bias generator 65 which, during the compare portion, is read therefrom as a predetermined output signal to be added to the output signals developed in the output windings of the rows of transfluxors in the array 30.

More particularly, consider the information stored in the first row of the array 30 prior to an energizing of the compare register 64. The transfluxors of the first row in storing the binary word 1001 each have flux states corresponding to the flux state diagrammatically represented in the chart of FIGURE 4, in the row entitled "State Before Ready Pulse."

At a time $t_1$ the output 102 of the timing source 100 is energized to simultaneously excite the compare register 64 and the output 92 of the bias generator driver 86. Since the binary word 1001 is stored in the compare register 64, stages Z1 and Z4 generate a positive ready pulse while the stages Z2 and Z3 of the compare register generate negative ready pulses. In response to the ready pulses the transfluxors of the first row in the array assume magnetic states corresponding to those indicated diagrammatically in the chart of FIGURE 4 depending upon their previous flux state. In addition, due to the energizing of the bias generator driver 86, the transfluxors of the bias generator 65 assume magnetic flux states as indicated in the final column of the chart in FIGURE 4 during the period of the ready pulses. Thus, for example, in response to the binary one stored in the stages Z1 and Z4 of the compare register 64, the direction of flux flow around the small aperture in the transfluxors 66 and 69 of the bias generator 65 is clockwise while the transfluxors 67 and 68 maintain their previous flux state, in this case blocked.

Figure 4:
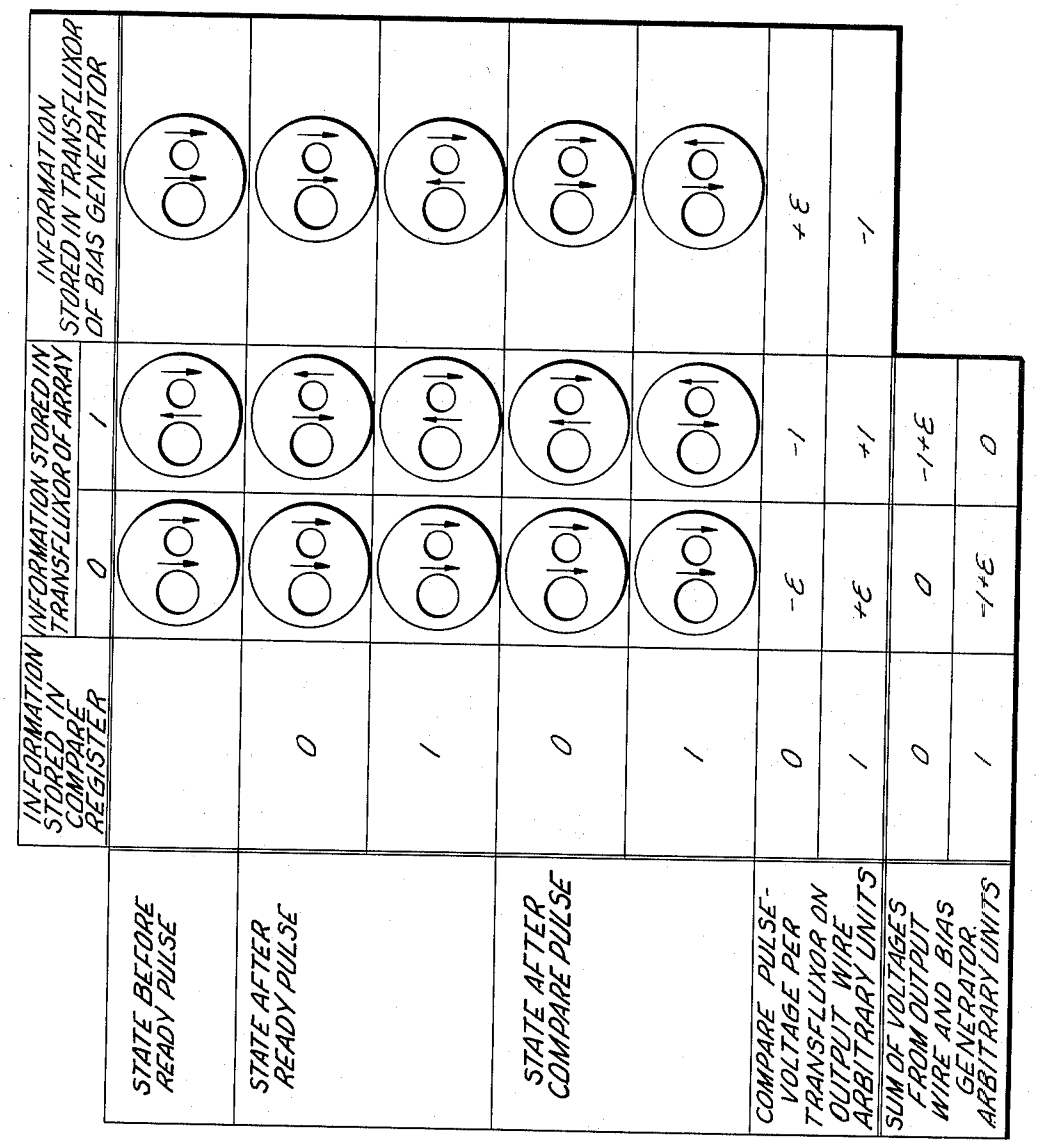
FIGURE 4 is a chart illustrating the condition of the transfluxors and the binary valve of the output signals developed in the comparing circuit during operation.

At a time $t_2$ the compare register 64 generates the compare pulses to interrogate the transfluxor array 30 and the bias generator 65. The compare pulses from the stages Z1 and Z4 of the compare register are of a negative polarity while the compare pulses from the stages 22 and 23 are positive in polarity. In response to the compare pulses the transfluxors of the array 30 assume states as diagrammatically represented in the chart of FIGURE 4 depending upon their previous flux state. Thus, for example, in the transfluxors 33 and 36 of the first row of the transfluxor array 30, flux is switched around the small apertures in a counter-clockwise direction to develop a positive output voltage on the output winding 51. In the transfluxors 34 and 35, however, no switching of flux occurs—the transfluxors remaining in a blocked state. Instead, only a small noise signal is developed in the output winding 51 due to the compare pulses being applied to the transfluxors 34 and 35. As indicated in the chart of FIGURE 4, the noise signals take the form of small voltage signals of negative polarity. Thus, due to the switching of flux in the transfluxors of the first row of the array 30, a voltage of $2-2\epsilon$ volts (arbitrary units) is developed in the output winding 51.

Similarly, with the binary coded words 1010 and 1101 stored in the second and third rows of the array 30, it can be shown by reference to FIGURE 4 that voltage of zero volts and a voltage of $1-\epsilon$ volts (arbitrary units) would be developed in the output windings 52 and 53 respectively.

During the compare pulse time the direction of flux also switches in the transfluxors of the bias generator 65 in accordance with the chart illustrated in FIGURE 4. Thus, for example, in the transfluxor 66, the direction of flux around the small aperture 74 switches in a counter-clockwise direction to develop a negative voltage on the output winding 76. A similar occurrence takes place in the transfluxor 69. The transfluxors 67 and 68 are in a blocked state, however, and the compare pulses applied thereto only develop a small noise signal of positive value in the output winding 76. Thus, the output signal developed in the output winding 76 due to a switching of flux in the transfluxors of the bias generator 65 is equal to $-2+2\epsilon$ volts (arbitrary units).

Since the output characteristics of the transfluxors of the bias generator are chosen to substantially match the output characteristics of the transfluxors of each associated column in the transfluxor array 30 and since each transfluxor in the bias generator is excited by the same current which excites the transfluxors of the associated column of transfluxors, the output signal developed in the output winding 76 for each switched transfluxor of the bias generator corresponds in magnitude and is opposite in polarity to the output signals generated by the unblocked transfluxors of the associated column in response to a binary input signal of like binary value. In addition, due to the use of transfluxors and their selection of output characteristics, a binary coded signal applied to a blocked transfluxor, generates a noise signal in the bias generator which is equal in magnitude and of an appropriate sense to cancel out the noise signals generated in blocked transfluxors in the associated column of the transfluxor array. The sum of the voltages thus developed for each transfluxor in the bias generator and each transfluxor in an associated column of the array 30 is represented in the last row of the chart of FIGURE 4 for all possible combinations of flux states. Accordingly, for a match between the binary information stored in the compare register 64 and a transfluxor of the array 30 a zero voltage is developed while for a mismatch a voltage of $-1+\epsilon$ volts (arbitrary units) is developed.

Due to the above described relationship between output signals developed by the transfluxors of the array 30 and those of the bias generator 65, the output signal of $-2+2\epsilon$ developed by the bias generator 65 in response to the binary input of 1001 is equal in magnitude and opposite in polarity to the $2-2\epsilon$ signal developer in the output winding 51 for the first row of transfluxors. Due to the series connection of the output winding 76 and each of the output windings 51, 52 and 53, the voltage signal developed by the bias generator 65 is added to the output signal developed in each row of transfluxors. This results in an output signal of zero volts at the output circuit 54 for the first row of transfluxors, an output voltage of $-2+2\epsilon$ volts at the output circuit 55 and an output voltage of $-1+\epsilon$ volts at the output circuit 56. Accordingly, a single discrete output signal (zero volts) is developed in the compare circuit—that signal appearing in the output conductor for the row in which a match occurs between the coded information therein and that applied to the comparing circuit from the computer. This singleness of the discrete output signal may be shown for any combination of binary coded words stored in the array 30 regardless of the number of transfluxors comprising the row-column array.

As represented in FIGURE 2, a fixed voltage may be added to the voltage generated by the transfluxors of the bias generator 65. The fixed voltage may be developed in a number of different fashions such as by the battery 78, as illustrated, or by a separate transfluxor or core element energized by an additional stage of the compare register 64 to provide a predetermined voltage output during the time of each compare pulse. The fixed voltage supplied by the battery 78 may be utilized to selectively forward bias the output circuitry of the comparing circuit 32 to provide a selective gating of location information. For example, the voltage generated by the battery may be of the order of a few tenths of a volt, just sufficient to forward bias a diode. Thus, the fixed voltage added to the output signal generated by the bias generator selectively forward biases the diode 59′ to provide current flow to an output connected to a junction of the diode 59′ and the load resistor 58′. Since the fixed voltage is small in magnitude it does not materially alter the voltage signals at the other output circuits. Thus, the diodes 59″ and 59‴ remain back biased and an output signal is only detected at the circuit 54.

To complete the operation of the comparing circuit illustrated in FIGURE 2, at a time $t_3$ the output 104 of the timing source 100 is energized to excite the output 94 of the bias generator driver 86. A large current signal represented by the waveform 98 is developed at the output 94 and applied to the drive winding 80 to block each transfluxor in the bias generator 65. The bias generator is then ready for another comparing operation of aid in the selective location of particular coded information stored in the transfluxor array 30.

Although the bias generator 65 has been described as being particularly useful in combination with an array of transfluxors it is to be understood that it may also find general use in other direct access memory systems. For example, the bias generator may be employed in a comparing circuit such as described in the copending patent application Serial No. 35,691, filed June 13, 1960 and assigned to the same assignee as the present invention.

What is claimed is:

1. A comprising circuit comprising:

a first plurality of magnetic cores arranged in a row-column array, each core having a substantially rectangular hysteresis characteristic and a plurality of apertures for defining first, second and third legs in each core to establish a pair of controllable flux paths of substantially different lengths linking the legs;

first binary input means for selectively blocking and unblocking the magnetic cores to store a binary one and a binary zero in each core of the first plurality of magnetic cores;

a second binary input means responsive to a binary coded input signal and including a plurality of compare windings, each compare winding being coupled to each magnetic core of a different column for establishing one direction of flux in the third leg of each unblocked magnetic core of the column in response to a binary one signal applied to the compare winding and for establishing an opposite direction for flux in the third leg of each unblocked core of the column in response to a binary zero signal applied to the compare winding;

a plurality of output windings, each output winding coupling each magnetic core in a different row for responding to changes in the direction of flux in the third leg of each core of the row;

a second plurality of magnetic cores, one associated with each column of the array and each having a substantially rectangular hysteresis characteristic and a plurality of apertures for defining first, second and third legs in the core to establish a pair of controllable flux paths of substantially different lengths linking the legs;

a common output winding coupling each core of the second plurality of cores for responding to changes in the direction of flux in the third leg of each core of the second plurality of magnetic cores;

means including the compare windings of each column of cores in the first plurality of cores for controlling the direction of flux in the third leg of the associated magnetic cores of the second plurality of cores;

an input winding coupling each of the cores of the second plurality of cores;

and means for momentarily energizing the input winding substantially coincident in time with a binary input signal applied to the plurality of compare windings of the second binary input means to switch the direction of flux in the third leg of each magnetic core of the second plurality of cores for which the binary input signal on the compare winding thereof is of a predetermined binary valve of develop a composite output pulse in the output winding of the second pluarlity of cores having a magnitude proportional to the number of binary coded input signals of the predetermined binary value applied to the plurality of compare windings and a polarity opposite to the polarity of a voltage induced in an output winding of the plurality of output windings by a switching of the direction of flux in the third leg of one of the first plurality of cores in response to a binary input signal of the same binary value, whereby a discrete output signal is generated on the output winding of the row in the array in which a match occurs between the binary coded information stored in the given row and the binary input signal applied to the plurality of compare windings of the second binary input means.

2. The appartus defined in claim 1 wherein input winding controls the flux in the first and second legs of each of the cores of the second plurality of cores.

3. The apparatus defined in claim 1 including means coupled to the input winding of the second plurality of cores for blocking each core of the second plurality of cores.

4. A generator for generating a composite output signal in accordance with the number of binary characters of a preselected value in a plurality of binary coded characters comprising input information, comprising:

a plurality of magnetic cores, one for each binary character comprising said input information each core having a substantially rectangular hysteresis characteristic and a plurality of apertures for defiining first, second and third legs in each core to establish a pair of controllable flux paths of substantially different lengths linking the legs;

a plurality of compare windings, each compare winding being coupled to a different magnetic core for independently controlling the direction of flux in at least the third leg of each magnetic core;

a drive winding coupling each magnetic core;

a common output winding coupling each magnetic core for responding to changes in the direction of flux in the third leg of each magnetic core;

means for delivering binary coded input information to the plurality of compare windings in a parallel circuit relationship, each binary character of the binary coded input information being delivered to a preselected compare winding;

and means for momentarily energizing the drive winding substantially coincident in time with the binary coded information being applied to the plurality of compare windings to switch the direction of flux in the third leg of each magnetic core for which the binary character of binary coded information on the compare winding thereof is a preselected binary value to develop a composite output pulse in the output winding having a magnitude proportional to a number of binary characters of the preselected value in the binary coded input information applied to the plurality of compare windings.

5. The apparatus defined in claim 4 wherein the drive windings control the flux in the first and second legs of each magnetic core.

6. The apparatus defined in claim 4 including means coupled to the drive winding for blocking each magnetic core.

7. A generator for generating a composite output signal in accordance with the number of binary characters of a preselected value in plurality of binary coded characters comprising input information, comprising:

a plurality of magnetic cores, one core for each binary character comprising said input information each core having a substantially rectangular hysteresis characteristic and a plurality of apertures for defining first, second and third legs in the core to establish a pair of controllable flux paths of substantially different lengths linking the legs;

means for magnetically blocking each magnetic core;

a common output winding coupling each magnetic core for responding to changes in the direction of flux in the third leg of each magnetic core;

control means coupled to each magnetic core for selectively unblocking the magnetic cores in response to a binary coded signal of a preselected value applied thereto;

means for delivering binary coded input information to the control means in a parallel circuit relationship, each binary character of the binary coded input information being delivered to a preselected control means;

and means responsive to the binary coded information for selectively switching the direction of flux in the third leg of the unblocked magnetic cores to develop a composite output pulse in the output winding having a magnitude proportional to and representative of the number of binary characters of the preselected value in the binary coded input information applied to the control means.

References Cited by the Examiner

UNITED STATES PATENTS

| | | | |
|---|---|---|---|
| 2,973,508 | 2/61 | Chadurjian | 340—174 |
| 3,104,380 | 9/63 | Haibt | 340—174 |
| 3,107,339 | 10/63 | Day | 340—146.2 |
| 3,116,421 | 12/63 | Newhall | 307—88 |
| 3,118,070 | 1/64 | Gianola | 307—88 |
| 3,121,217 | 2/64 | Seebar | 340—174 |
| 3,127,587 | 3/64 | Rasmussen | 340—146.2 |

IRVING L. SRAGOW, *Primary Examiner.*

BERNARD KONICK, *Examiner.*